United States Patent
Niu et al.

(10) Patent No.: US 8,107,552 B2
(45) Date of Patent: Jan. 31, 2012

(54) SYSTEM AND METHOD OF WIRELESS COMMUNICATION OF UNCOMPRESSED VIDEO HAVING A FAST FOURIER TRANSFORM-BASED CHANNEL INTERLEAVER

(75) Inventors: Huaning Niu, Sunnyvale, CA (US); Pengfei Xia, San Jose, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1155 days.

(21) Appl. No.: 11/717,334

(22) Filed: Mar. 12, 2007

(65) Prior Publication Data

US 2008/0002782 A1 Jan. 3, 2008

Related U.S. Application Data

(60) Provisional application No. 60/817,524, filed on Jun. 28, 2006.

(51) Int. Cl.
*H04L 27/00* (2006.01)
(52) U.S. Cl. ........ 375/295; 375/260; 375/296; 375/299; 375/306; 375/316; 370/312; 370/343
(58) Field of Classification Search .................. 375/243, 375/259, 260, 290, 292, 295, 296, 298, 299, 375/306, 316, 327, 343, 350, 359, 371, 220, 375/240.01, 261, 286, 267, 346, 242, 24
See application file for complete search history.

(56) References Cited

U.S. PATENT DOCUMENTS 5,105,442 A 4/1992 Wei
5,508,752 A 4/1996 Kim et al.
(Continued)

FOREIGN PATENT DOCUMENTS

EP 0537932 A2 4/1993
(Continued)

OTHER PUBLICATIONS

European Telecommunications Standards Institute, "Digital Video Broadcasting: Framing structure, channel coding and modulation for digital terrestrial television," ETSI EN 300 744, European Broadcasting Union, Jan. 2001, pp. 1-49.

(Continued)

*Primary Examiner* — Shuwang Liu
*Assistant Examiner* — Hirdepal Singh
(74) *Attorney, Agent, or Firm* — Kenneth L. Sherman, Esq.; Michael Zarrabian, Esq.; Myers Andras Sherman & Zarrabian LLP

(57) ABSTRACT

A system and a method of using fast Fourier transform (FFT) based tone interleaver for OFDM are disclosed. One embodiment of the system includes an OFDM transmitter, which includes an inverse fast Fourier transform (IFFT) subsystem. The IFFT subsystem includes a bit-reversal (or quarternary-digit reversal depending on implementation) module followed by a butterfly operator. The bit-reversal (or quarternary-digit reversal) module output is connected to the butterfly operator input. The OFDM transmitter further includes a tone interleaver having an input and an output. The symbol interleaver output is connected to the bit reversal (or quarternary-digit reversal) module input. The tone interleaver is configured to rearrange the input symbol sequence such that the symbol sequence input to the tone interleaver input is the same as the symbol sequence input to the butterfly operator input.

7 Claims, 9 Drawing Sheets

U.S. PATENT DOCUMENTS

| | | | |
|---|---|---|---|
| 5,598,432 | A | 1/1997 | Wei |
| 5,691,995 | A | 11/1997 | Ikeda et al. |
| 5,907,582 | A | 5/1999 | Yi |
| 6,141,384 | A | 10/2000 | Wittig et al. |
| 6,553,540 | B1 | 4/2003 | Schramm et al. |
| 6,920,179 | B1 | 7/2005 | Anand et al. |
| 7,095,708 | B1 | 8/2006 | Alamouti et al. |
| 7,170,849 | B1 * | 1/2007 | Arivoli et al. ................. 370/208 |
| 7,376,117 | B2 * | 5/2008 | Erlich et al. ................. 370/343 |
| 7,450,612 | B2 | 11/2008 | Floriach et al. |
| 7,535,819 | B1 * | 5/2009 | Larsson et al. ................ 370/208 |
| 7,742,535 | B2 * | 6/2010 | Braithwaite ................. 375/260 |
| 8,006,168 | B2 | 8/2011 | Reznic |
| 2001/0030939 | A1 | 10/2001 | Vijayan et al. |
| 2002/0053049 | A1 | 5/2002 | Shiomoto et al. |
| 2004/0015773 | A1 | 1/2004 | D'Arcy et al. |
| 2004/0047424 | A1 | 3/2004 | Ramaswamy et al. |
| 2004/0120349 | A1 | 6/2004 | Border et al. |
| 2004/0131125 | A1 | 7/2004 | Sanderford et al. |
| 2004/0151146 | A1 * | 8/2004 | Hammerschmidt .......... 370/338 |
| 2005/0047325 | A1 * | 3/2005 | Singh et al. ................... 370/210 |
| 2005/0101319 | A1 | 5/2005 | Murali et al. |
| 2005/0135611 | A1 | 6/2005 | Hardacker |
| 2005/0154967 | A1 | 7/2005 | Heo et al. |
| 2005/0232137 | A1 | 10/2005 | Hosur et al. |
| 2005/0249183 | A1 | 11/2005 | Danon et al. |
| 2005/0265469 | A1 * | 12/2005 | Aldana et al. ................. 375/260 |
| 2006/0002486 | A1 | 1/2006 | Van Nee et al. |
| 2006/0005106 | A1 | 1/2006 | Lane et al. |
| 2006/0092893 | A1 * | 5/2006 | Champion et al. ............ 370/338 |
| 2006/0107171 | A1 | 5/2006 | Skraparlis |
| 2006/0212773 | A1 * | 9/2006 | Aytur et al. .................... 714/755 |
| 2006/0281487 | A1 * | 12/2006 | Girardeau et al. ......... 455/553.1 |
| 2007/0115797 | A1 | 5/2007 | Reznic et al. |
| 2007/0160139 | A1 | 7/2007 | Vasquez et al. |
| 2007/0223572 | A1 | 9/2007 | Xia et al. |
| 2007/0260660 | A1 * | 11/2007 | Su ................................ 708/404 |
| 2007/0286103 | A1 | 12/2007 | Niu et al. |
| 2007/0288980 | A1 | 12/2007 | Niu et al. |
| 2008/0089427 | A1 | 4/2008 | Xia et al. |
| 2009/0016359 | A1 | 1/2009 | Niu et al. |
| 2009/0022079 | A1 * | 1/2009 | Zhou et al. .................... 370/312 |
| 2009/0323563 | A1 * | 12/2009 | Ho et al. ....................... 370/280 |

FOREIGN PATENT DOCUMENTS

| | | |
|---|---|---|
| JP | 2001-251199 | 9/2001 |
| JP | 2003-179887 | 6/2003 |
| JP | 2006-157898 | 6/2006 |
| WO | WO 02/35853 A2 | 5/2002 |
| WO | WO 2004/049581 A2 | 6/2004 |
| WO | WO 2005/036790 | 4/2005 |
| WO | 2005041420 A1 | 5/2005 |
| WO | WO 2005/076536 A1 | 8/2005 |
| WO | WO 2006/007571 A1 | 1/2006 |
| WO | WO 2006/020741 A2 | 2/2006 |
| WO | WO 2007/111442 A1 | 10/2007 |
| WO | WO 2008/111707 A1 | 9/2008 |

OTHER PUBLICATIONS

Hassibi et al., "How Much Training is Needed in Multiple-Antenna Wireless Links?", IEEE Transactions on Information Theory, vol. 49, No. 4, Apr. 2003, 951-963.

Xia et al., "Achieving the Welch Bound With Difference Sets", IEEE Transactions on Information Theory, vol. 51, No. 5, May 2005, 1900-1907.

Xia et al., "Adaptive MIMO-OFDM Based on Partial Channel State Information", IEEE Transactions on signal processing, vol. 52, No. 1, Jan. 2004, 202-213.

International Preliminary Report on Patentability and Written Opinion dated Jan. 6, 2009 for PCT/KR2007/003125, filed Jun. 27, 2007.
International Search Report dated Jul. 16, 2007 for PCT/KR2007/001419, filed Mar. 23, 2007.

International Preliminary Report on Patentability and Written Opinion dated Sep. 30, 2008 for PCT/KR2007/001419, filed Mar. 23, 2007.

International Search Report dated Nov. 19, 2007 for PCT/KR2007/003172, filed Jun. 29, 2007.

International Search Report dated May 21, 2008 for Application No. PCT/KR2008/000886, filed Feb. 15, 2008.

U.S. Office Action dated Aug. 28, 2009 in U.S. Appl. No. 11/776,506, filed Jul. 11, 2007.

U.S. Office Action dated Jun. 1, 2009 in U.S. Appl. No. 11/724,735, filed Mar. 15, 2007.

U.S. Office Action dated Dec. 11, 2009 in U.S. Appl. No. 11/724,735, filed Mar. 15, 2007.

Chu et al., "Inside the FFT Black Box", CRC Press 2000.

International Search Report dated Oct. 10, 2007 (International Application No. PCT/KR2007/003125).

Hachman, "CE Giants back Amimon's Wireless HDTV Tech," PCMAG.com, 1 page (Jul. 23, 2008).

"NEC develops compact millimeter-wave transceiver for uncompressed HDTV signal transmission," *NE Asia Online*, Apr. 5, 2005, (Downloaded from http://neasia.nikkeibp.com/topstory/000913 on Sep. 29, 2006).

WirelessHD Specification Version 1.0 Overview, Oct. 9, 2007, 77 pages.

Caetano. Lianne, SiBEAM wireless beyond boundaries, 60 GHz Architecture for Wireless Video Display, Mar. 2006.

U.S. Office Action dated Jun. 28, 2010 in U.S. Appl. No. 11/724,760, filed Mar. 15, 2007.

Forney, G.D., Jr., "Burst Correcting Codes for the Classic Bursty Channel," IEEE Trans. On Communications Technology, vol. 19, No. 5, Oct. 1971, pp. 772-781, United States.

FRESHNEWS.COM, "SiBEAM Receives Equity Investment from Best Buy," FreshNews.com, Jan. 4, 2010, pp. 1-2, United States, downloaded from http://freshnews.com/print/node/261440 on Feb. 2, 2010.

Fischer, W., "Digital Video and Audio Broadcasting Technology: A Practical Engineering Guide," Second Edition, 2008, pp. 98-108, United States.

International Preliminary Report on Patentability and Written Opinion dated Feb. 9, 2010 for International Application No. PCT/KR2008/000886, filed Feb. 9, 2010, pp. 1-7, Korean Intellectual Property Office, Seo-gu, Daejeon, Republic of Korea.

Mexican Notice of Allowance dated Aug. 26, 2010 for Mexican Application No. MX/A/2008/016536, pp. 1-2, Mexican Institute of Industrial Property, United Mexican States [Machine-language translation submitted, 1p.]

Korean Decision to Grant dated Aug. 18, 2010 issued in Korean Patent Application No. 10-2008-7013962, pp. 1-5, Korean Intellectual Property Office, Seo-gu, Daejeon, Republic of Korea [Machine-language translation included, 3 p.]

Korean Non-Final Office Action dated Feb. 23, 2010 issued in Korean Patent Application No. 10-2008-7013962, pp. 1-5, Korean Intellectual Property Office, Seo-gu, Daejeon, Republic of Korea [Machine-language translation included, 5 p.]

Chinese Non-Final Office Action dated Dec. 25, 2009 for Chinese Application No. 2007100894894, pp. 1-5, Chinese Patent Office, People's Republic of China [Machine-language translation included, 2 p.]

Rekh. S. et al., "Optimal choice of interleaver for turbo codes," Academic Open Internet Journal, vol. 15, 2005, www.acadjournal.com, pp. 1-8, United States, downloaded from http://www.acadjournal.com/2005/v15/part6/p7.

Chang, Y.C. et al., "A Low-Complexity Unequal Error Protection of H.264/AVC Video Using Adaptive Hierarchical QAM," IEEE Transactions on Consumer Electronics, vol. 52, Issue 4, IEEE, Nov. 2006, pp. 1153-1158, United States.

U.S. Non-Final Office Action for U.S. Appl. No. 11/835,302 mailed on Sep. 20, 2011.

* cited by examiner

SYSTEM AND METHOD OF WIRELESS COMMUNICATION OF UNCOMPRESSED VIDEO HAVING A FAST FOURIER TRANSFORM-BASED CHANNEL INTERLEAVER

CROSS-REFERENCE TO RELATED APPLICATIONS

This application claims the priority benefit under 35 U.S.C. §119(e) of U.S. Provisional Patent Application Ser. No. 60/817,524, filed on Jun. 28, 2006. The full disclosure of the provisional application is incorporated herein by reference.

BACKGROUND OF THE INVENTION

1. Field of the Invention

The present invention relates to wireless transmission of video information, and in particular, to transmission of uncompressed high definition video information over wireless channels.

2. Description of the Related Technology

With the proliferation of high quality video, an increasing number of electronic devices, such as consumer electronic devices, utilize high definition (HD) video which can require about several Giga bps (bits per second) in bandwidth for transmission. As such, when transmitting such HD video between devices, conventional transmission approaches compress the HD video to a fraction of its size to lower the required transmission bandwidth. The compressed video is then decompressed for consumption. However, with each compression and subsequent decompression of the video data, some data can be lost and the picture quality can be reduced.

The High-Definition Multimedia Interface (HDMI) specification allows transfer of uncompressed HD signals between devices via a cable. While consumer electronics makers are beginning to offer HDMI-compatible equipment, there is not yet a suitable wireless (e.g., radio frequency) technology that is capable of transmitting uncompressed HD video signals. Wireless local area network (WLAN) and similar technologies can suffer interference issues when several devices are connected which do not have the bandwidth to carry the uncompressed HD signals.

Similar to other wirelessly-transmitted signals, uncompressed HD signals are subject to various errors during wireless transmission thereof. In addition, systems and methods for wireless transmission of uncompressed HD signals have inherent design limitations due to a high volume of processed data. Therefore, there is a need to provide an effective and simplified error prevention scheme for wireless transmission of uncompressed HD signals.

SUMMARY OF CERTAIN INVENTIVE ASPECTS

One embodiment is a transmitter for a wireless communication system. The transmitter comprises a symbol interleaver configured to reorder a first sequence of a data stream to generate a second sequence of the data stream; and an inverse fast Fourier transform (IFFT) subsystem. The IFFT subsystem comprises: a reversal module configured to reorder the second sequence of the data stream to generate a third sequence of the data stream, and an IFFT operator configured to perform an IFFT operation on the third sequence of the data stream. The symbol interleaver is configured to reorder the first sequence of the data stream such that the first sequence is the same as the third sequence.

The IFFT operation may be implemented using radix-2 FFT, radix-4 FFT, or split-radix FFT. The symbol interleaver may comprise a tone interleaver. The reversal module may comprise a bit reversal module configured to reorder bits of the second sequence of the data stream.

The first sequence may be represented by a first index represented by Equation 1 and the second data sequence may be represented by a second index represented by Equation 2:

$$k = \sum_{j=0}^{n-1} a_j 2^j \quad (1)$$

$$\hat{k} = \sum_{j=0}^{n-1} a_j 2^{n-1-j} \quad (2)$$

wherein k is the first index and $\hat{k}$ is the second index; and $a_j$ is 1 or 0; and wherein the IFFT size of the IFFT operator is $N=2^n$. The third sequence may be represented by the first index.

The reversal module may comprise a bit reversal module configured to reorder quaternary-digits of the second sequence of the data stream. The first sequence may be represented by a first index represented by Equation 7, and the second data sequence may be represented by a second index represented by Equation 8:

$$m = \sum_{j=0}^{n-1} a_j 4^j \quad (7)$$

$$\hat{m} = \sum_{j=0}^{n-1} a_j 4^{n-1-j} \quad (8)$$

wherein m is the first index and $\hat{m}$ is the second index; $a_j$ is 0, 1, 2, or 3; and wherein the IFFT size of the IFFT operator is $N=4^n$.

The transmitter may further comprise: a tone adder configured to provide at least one tone of a null tone, a direct current (DC) tone, and a pilot tone; a mapper configured to provide a data stream; and a multiplexer configured to multiplex the at least one tone from the tone adder and the data stream from the mapper to generate the first sequence of the data stream. The multiplexer may be configured to insert the at least one tone at a first predetermined position in the first sequence of the data stream, wherein the first predetermined position corresponds to a second predetermined position in the second sequence of the data stream. In order to make sure that the null/DC/pilot tones are at the right positions after symbol interleaving by the symbol interleaver, they may be inserted at the corresponding reversal positions by the multiplexer. After the symbol interleaver performs reordering, the null/DC/pilot tones are positioned at the right positions for the IFFT operation. The multiplexer may be configured to supply the first sequence of the data stream to the symbol interleaver. The multiplexer may be an orthogonal frequency-division multiplexing (OFDM) symbol framing multiplexer. The transmitter may be configured to transmit uncompressed high definition video data.

Another embodiment is an audiovisual device comprising: the transmitter described above; and electronic circuitry configured to process audiovisual data from a video data source.

Yet another embodiment is a transmitter for a wireless communication system, comprising: a tone adder configured to provide at least one tone of a null tone, a DC tone, and a pilot tone; a mapper configured to provide a first data stream; a multiplexer configured to multiplex the at least one tone and the first data stream to generate a second data stream; and an inverse fast Fourier transform (IFFT) operator configured to receive the second data stream from the multiplexer and perform an IFFT operation on the second data stream, wherein the transmitter does not include a reversal module configured to reorder a data sequence input to or output from the IFFT operator.

Another embodiment is a transmitter for a wireless communication system, comprising: means for first reordering bits in a first sequence of a data stream to generate a second sequence of the data stream; means for second reordering bits in the second sequence of the data stream to generate a third sequence of the data stream, such that the third sequence is the same as the first sequence; and means for performing an IFFT operation on the third sequence of the data stream.

Yet another embodiment is a method of wirelessly transmitting data. The method comprises: first reordering bits in a first sequence of a data stream to generate a second sequence of the data stream; second reordering bits in the second sequence of the data stream to generate a third sequence of the data stream, such that the third sequence is the same as the first sequence; and performing an IFFT operation on the third sequence of the data stream.

The IFFT operation may comprise radix-2 FFT, radix-4 FFT, or split-radix FFT. Second reordering the bits may comprise reordering the bits one bit at a time. The first sequence may be represented by a first index represented by Equation 1 and the second data sequence may be represented by a second index represented by Equation 2:

$$k = \sum_{j=0}^{n-1} a_j 2^j \quad (1)$$

$$\hat{k} = \sum_{j=0}^{n-1} a_j 2^{n-1-j} \quad (2)$$

wherein k is the first index and $\hat{k}$ is the second index; and $a_j$ is 1 or 0; and wherein the IFFT size of the IFFT operator is $N=2^n$. The third sequence may be represented by the first index.

Second reordering the bits may comprise reordering the bits four bits at a time. The first sequence may be represented by a first index represented by Equation 7 and the second data sequence may be represented by a second index represented by Equation 8:

$$m = \sum_{j=0}^{n-1} a_j 4^j \quad (7)$$

$$\hat{m} = \sum_{j=0}^{n-1} a_j 4^{n-1-j} \quad (8)$$

wherein m is the first index and $\hat{m}$ is the second index; $a_j$ is 0, 1, 2, or 3; and wherein the IFFT size of the IFFT operator is $N=4^n$.

The method may further comprise inserting at least one of a null tone, a direct current (DC) tone, and a pilot tone into the data stream before first reordering the bits. The data stream may comprise uncompressed high definition video data.

DETAILED DESCRIPTION OF CERTAIN INVENTIVE EMBODIMENTS

Figure 1:
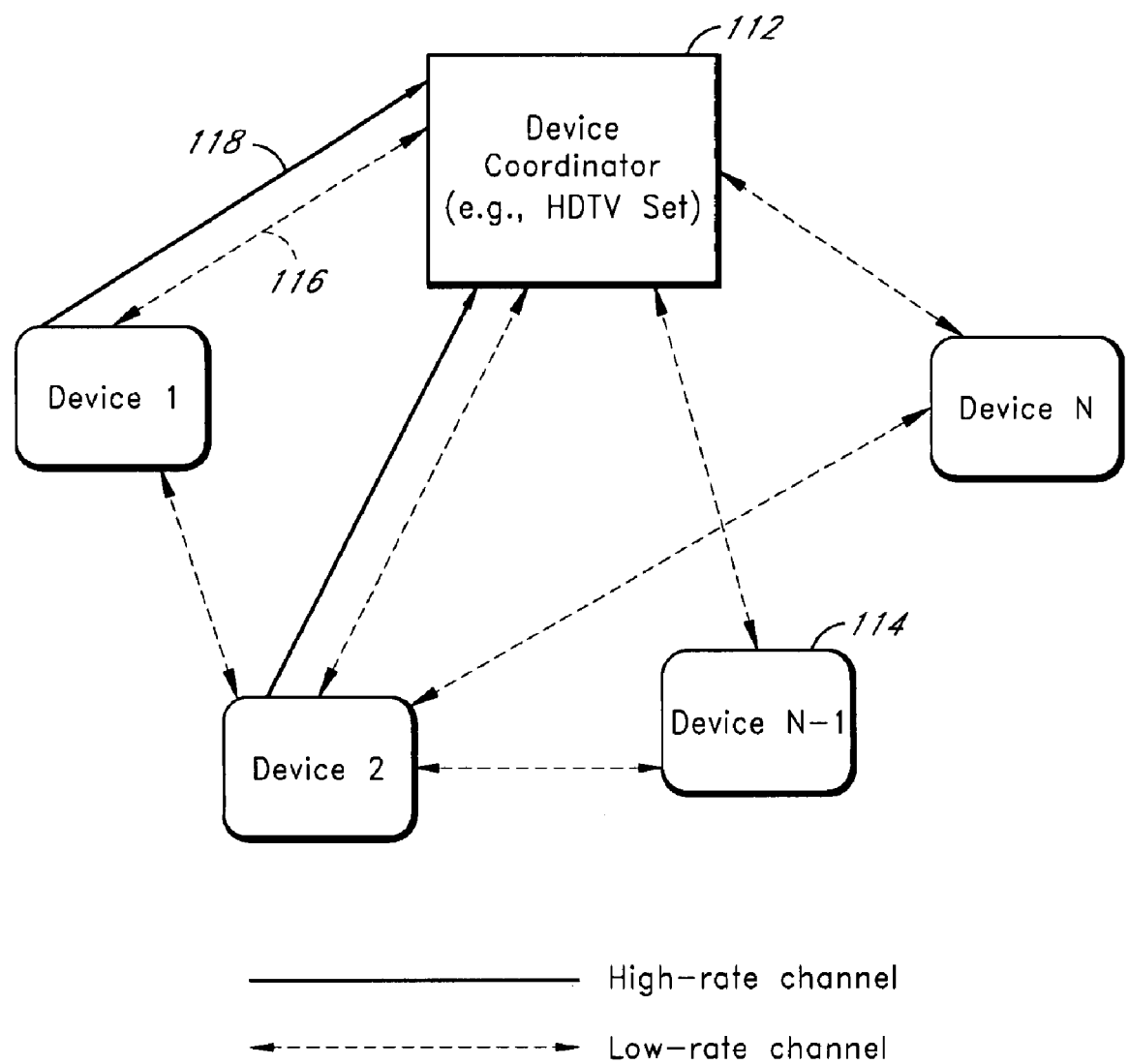
FIG. 1 is a functional block diagram of a wireless network that implements uncompressed HD video transmission between wireless devices according to one embodiment of the system and method.

Various aspects and features of the invention will become more fully apparent from the following description and appended claims taken in conjunction with the foregoing drawings. In the drawings, like reference numerals indicate identical or functionally similar elements.

Certain embodiments provide a method and system for transmission of uncompressed HD video information from a sender to a receiver over wireless channels. Example implementations of the embodiments in a wireless high definition (HD) audio/video (A/V) system will now be described. FIG. 1 shows a functional block diagram of a wireless network 100 that implements uncompressed HD video transmission between A/V devices such as an A/V device coordinator and A/V stations, according to certain embodiments. In other embodiments, one or more of the devices can be a computer, such as a personal computer (PC). The network 100 includes a device coordinator 112 and multiple A/V stations 114 (e.g., Device 1 . . . Device N).

The A/V stations 114 utilize a low-rate (LR) wireless channel 116 (dashed lines in FIG. 1), and may use a high-rate (HR) channel 118 (heavy solid lines in FIG. 1), for communication between any of the devices. The device coordinator 112 uses a low-rate channel 116 and a high-rate wireless channel 118, for communication with the stations 114. Each station 114 uses the low-rate channel 116 for communications with other stations 114. The high-rate channel 118 supports single direction unicast transmission over directional beams established by beamforming, with e.g., multi-GB/s bandwidth, to support uncompressed HD video transmission. For example, a set-top box can transmit uncompressed video to a HD television (HDTV) over the high-rate channel 118. The low-rate channel 116 can support bi-directional transmission, e.g., with up to 40 Mbps throughput in certain embodiments. The low-rate channel 116 is mainly used to transmit control frames such as acknowledgement (ACK) frames. For example, the low-rate channel 116 can transmit an acknowledgement from the HDTV to the set-top box. It is also possible that some low-rate data like audio and compressed video can be transmitted on the low-rate channel between two devices directly. Time division duplexing (TDD) is applied to the high-rate and low-rate channel. At any one time, the low-rate and high-rate channels cannot be used in parallel for transmission, in certain embodiments. Beamforming technology can be used in both low-rate and high-rate channels. The low-rate channels can also support omni-directional transmissions.

In one example, the device coordinator 112 is a receiver of video information (hereinafter "receiver 112"), and the station 114 is a sender of the video information (hereinafter "sender 114"). For example, the receiver 112 can be a sink of video and/or audio data implemented, such as, in an HDTV set in a home wireless network environment which is a type of WLAN. The sender 114 can be a source of uncompressed video or audio. Examples of the sender 114 include a set-top box, a DVD player or recorder, digital camera, camcorder, and so forth.

Figure 2:
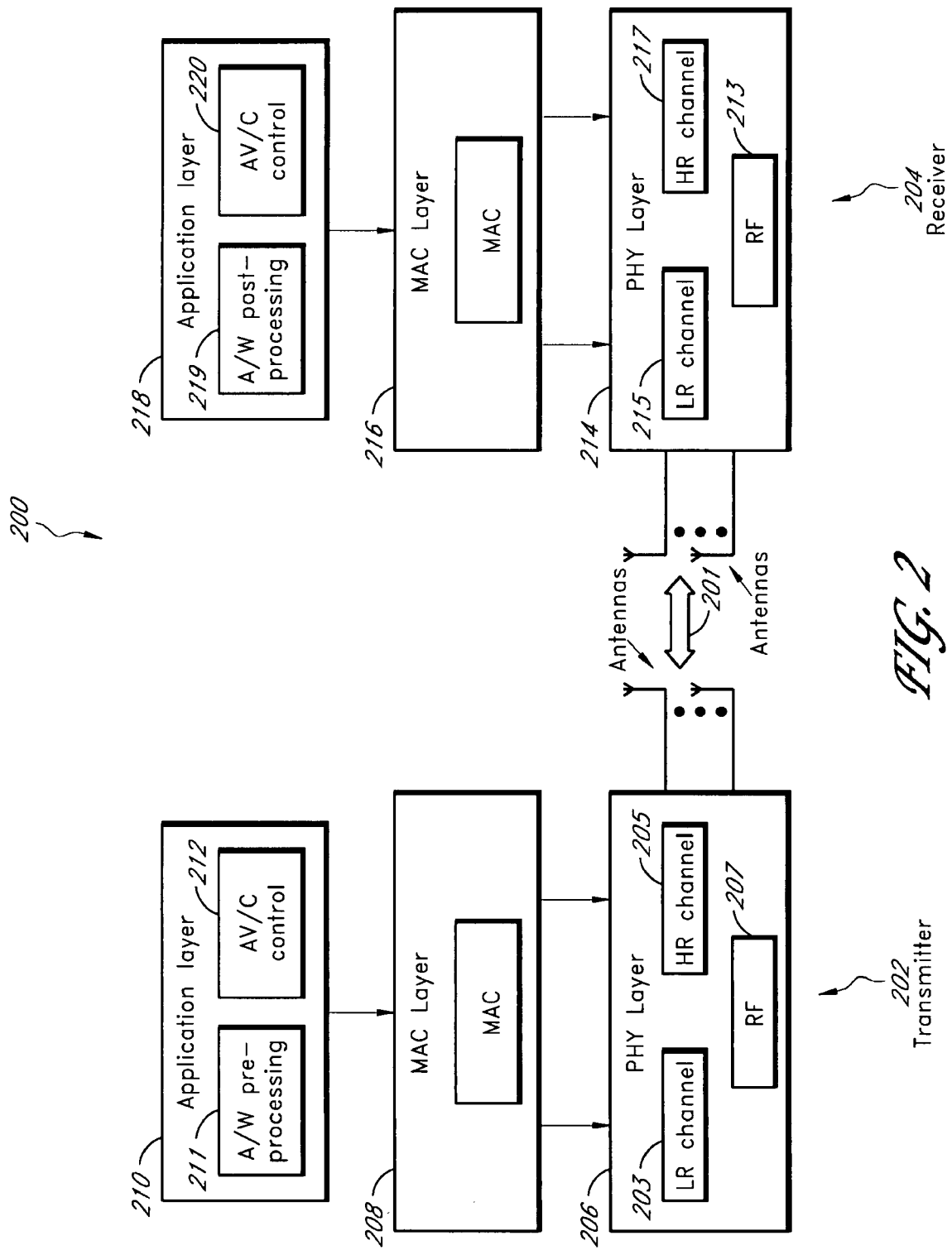
FIG. 2 is a functional block diagram of an example communication system for transmission of uncompressed HD video over a wireless medium, according to one embodiment of the system and method.

FIG. 2 illustrates a functional block diagram of an example communication system 200. The system 200 includes a wireless transmitter 202 and wireless receiver 204. The transmitter 202 includes a physical (PHY) layer 206, a media access control (MAC) layer 208 and an application layer 210. Similarly, the receiver 204 includes a PHY layer 214, a MAC layer 216, and an application layer 218. The PHY layers provide wireless communication between the transmitter 202 and the receiver 204 via one or more antennas through a wireless medium 201.

The application layer 210 of the transmitter 202 includes an A/V pre-processing module 211 and an audio video control (AV/C) module 212. The A/V pre-processing module 211 can perform pre-processing of the audio/video such as partitioning of uncompressed video. The AV/C module 212 provides a standard way to exchange A/V capability information. Before a connection begins, the AV/C module negotiates the A/V formats to be used, and when the need for the connection is completed, AV/C commands are used to stop the connection.

In the transmitter 202, the PHY layer 206 includes a low-rate (LR) channel 203 and a high rate (HR) channel 205 that are used to communicate with the MAC layer 208 and with a radio frequency (RF) module 207. In certain embodiments, the MAC layer 208 can include a packetization module (not shown). The PHY/MAC layers of the transmitter 202 add PHY and MAC headers to packets and transmit the packets to the receiver 204 over the wireless channel 201.

In the wireless receiver 204, the PHY/MAC layers 214, 216, process the received packets. The PHY layer 214 includes a RF module 213 connected to the one or more antennas. A LR channel 215 and a HR channel 217 are used to communicate with the MAC layer 216 and with the RF module 213. The application layer 218 of the receiver 204 includes an A/V post-processing module 219 and an AV/C module 220. The module 219 can perform an inverse processing method of the module 211 to regenerate the uncompressed video, for example. The AV/C module 220 operates in a complementary way with the AV/C module 212 of the transmitter 202.

Figure 3:
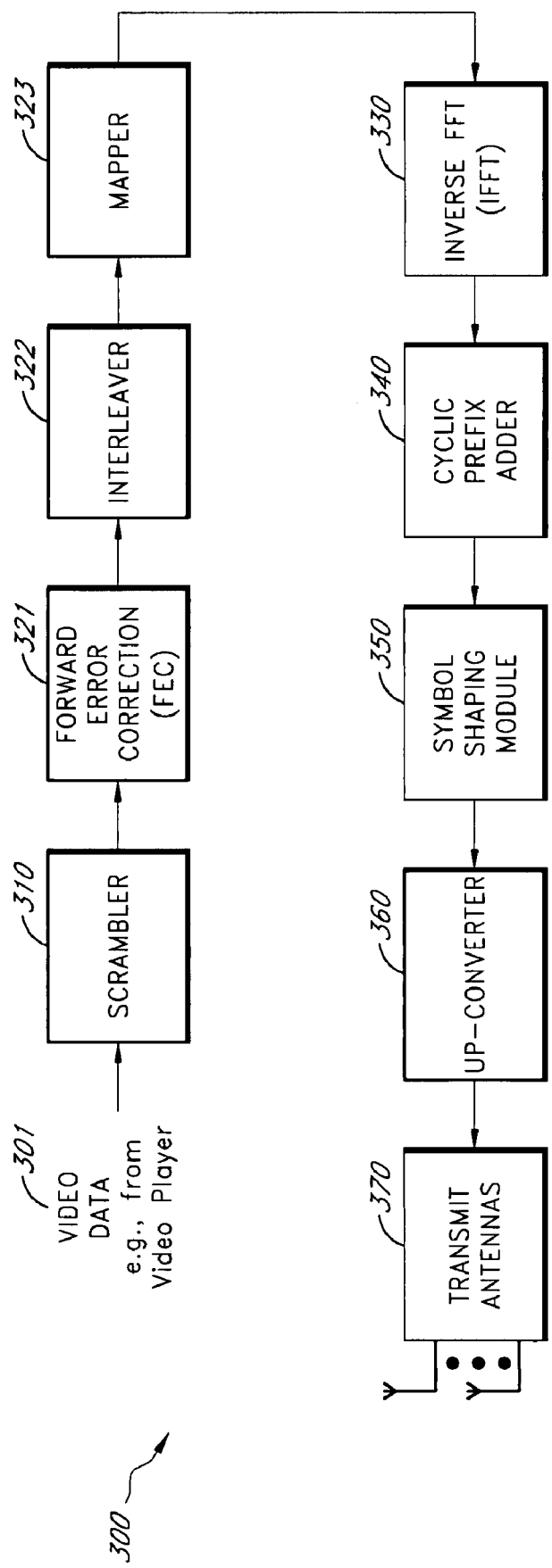
FIG. 3 is a functional block diagram of an example transmitter for transmission of uncompressed HD video over a wireless medium, according to one embodiment of the system and method.

FIG. 3 illustrates one embodiment of a transmitter 300 for transmission of uncompressed HD video over a wireless medium. The illustrated transmitter 300 includes a scrambler 310, a forward error correction (FEC) subsystem 321, an interleaver 322, a mapper 323, an inverse fast Fourier transform (IFFT) subsystem 330, a cyclic prefix adder 340, a symbol shaping module 350, an up-converter 360, and transmit antennas 370. In other embodiments, the mapper 323 may be positioned between the FEC subsystem 321 and the interleaver 322. It will be appreciated that the foregoing modules, subsystems, or devices can be implemented using hardware, software or a combination of both.

The scrambler 310 is configured to receive video data 301 from, for example, a video player. The scrambler 310 is further configured to transpose or invert signals or otherwise encodes data to make the data unintelligible at a receiver not equipped with an appropriately set descrambling device. Scrambling is accomplished by the addition of components to the original signal or the changing of some important component of the original signal in order to make extraction of the original signal difficult. Examples of the latter can include removing or changing vertical or horizontal sync pulses in video signals.

The FEC subsystem 321 is configured to provide protection against errors during wireless data transmission. The FEC subsystem 321 adds redundant data to the scrambled video data input to the subsystem 321.

The redundant data allows the receiver to detect and correct errors without asking the transmitter for additional data. In adding redundant data to the video data, the FEC subsystem 321 can use error-coding encoders, such as a Reed-Solomon (RS) encoder and a convolutional code (CC) encoder. In other embodiments, the FEC subsystem 321 may use various other encoders, including, but not limited to, a Golay encoder and a Hamming, Bose, Ray-Chaudhuri, Hocquenghem (BCH) encoder. In certain embodiments, the FEC subsystem 321 may optionally include an interleaver configured to rearrange or reorder a data sequence to protect data against burst transmission errors.

A Reed-Solomon (RS) encoder uses Reed-Solomon (RS) codes in adding redundant data to raw data. RS codes are block-based error correcting codes that work by over-sampling a polynomial constructed from raw data. The RS encoder takes a block of raw digital data and adds redundant bits to the block. An RS code is typically specified as RS (n, k). For example, an RS code operating on 8-bit symbols has $n=2^8-1=255$ symbols per block. The number k (k<n) of data symbols in the block is a design parameter. An RS code may encode k=216 8-bit symbols plus 8 8-bit parity symbols in an n=224-symbol block. This is denoted as a (n, k)=(224, 216) code, which is capable of correcting up to 4 symbol errors per block. It will be appreciated that various other configurations of RS codes can also be adapted for use with the RS encoder.

A convolutional code (CC) encoder (or convolutional encoder) uses a convolutional code (CC) in adding redundancy to raw data. A convolutional code is a type of error-correcting code. In a CC encoder, each m-bit information symbol (each m-bit string) to be encoded is transformed into an n-bit symbol (m/n is the code rate (n>=m)). In addition, the transformation is a function of the last k information symbols (k is the constraint length of the code).

The interleaver 322 is configured to rearrange or reorder a data sequence to protect the data against burst errors. The interleaver 322 may include a bit interleaver and/or a symbol interleaver. The bit interleaver is configured to rearrange a sequence of data bits. The symbol interleaver is configured to rearrange a sequence of complex (IQ) symbols corresponding to groups of multiple bits. In certain embodiments, the symbol interleaver rearranges multiple bits (e.g., four bits) as a symbol group, and yet achieves the same effect as interleaving complex symbols. This is because a predetermined number of bits correspond to a single complex symbol.

The mapper 323 is configured to map data bits to complex (IQ) symbols (a frequency domain data). The complex symbols are used to modulate a carrier for the wireless transmission described above. The mapper 323 may use various modulation schemes, including, but not limited to, Binary Phase-Shift Keying (BPSK), Quadrature Phase-Shift Keying (QPSK), and Quadrature Amplitude Modulation (QAM).

In one embodiment, the mapper 323 is a Quadrature Amplitude Modulation (QAM) mapper, for example, a 16-QAM mapper or 64-QAM mapper. Quadrature Amplitude Modulation (QAM) is a modulation scheme which conveys data by modulating the amplitude of two carrier waves. The two waves, usually sinusoids, are out of phase with each other by 90° and thus are called quadrature carriers. The number, 16 or 64, in front of "QAM" refers to the total number of symbols to which the mapper can map groups of data bits. For example, a 16-QAM mapper converts 4-bit data into $2^4=16$ symbols. Typically, for QAM mappers, a constellation diagram is used for representing such symbols.

The inverse fast Fourier transform (IFFT) subsystem 330 is configured to transform frequency domain data from the mapper 323 back into corresponding time domain data. The IFFT subsystem 330 converts a number of complex symbols, which represent a signal in the frequency domain, into the equivalent time domain signal. The IFFT subsystem 330 also serves to ensure that carrier signals produced are orthogonal.

The cyclic prefix adder 340 is configured to decrease receiver complexity. The cyclic prefix adder 340 may also be referred to as a "guard interval adder." The cyclic prefix adder 340 is configured to add a cyclic prefix interval (or guard interval) to an IFFT-processed signal block at its front end. The duration of such a cyclic prefix interval may be $\frac{1}{32}$, $\frac{1}{16}$, $\frac{1}{8}$, or $\frac{1}{4}$ of the original signal block duration.

The symbol shaping module 350 is configured to interpolate and low-pass filter the signal generated from the IFFT subsystem 330. The output of the symbol shaping module 350 is the complex baseband of the output signal of the IFFT subsystem 330.

The up-converter 360 is configured to up-convert the output of the symbol shaping module 350 to an intermediate frequency (IF). The up-converter 360 is further configured to up-convert the up-converted signal to a radio frequency (RF).

The transmit antennas 370 are configured to transmit the signal output from the up-converter 360 over a wireless medium to a receiver. The transmit antennas 370 may include any antenna system or module suitable for wirelessly transmitting uncompressed HD video signals.

FFT-Friendly Symbol Interleaver

In one embodiment, a wireless HD transmitter includes an IFFT subsystem performing an IFFT operation. The IFFT operation is an inverse process of a fast Fourier transform (FFT) operation performed at a receiver of the transmitter. Fast Fourier transform (FFT) is a fast and efficient implementation of discrete Fourier Transform. It can be implemented in many different ways for hardware efficiency. Examples of FFT include, but are not limited to, radix-2 FFT, radix-4 FFT, and split-radix operation.

In one embodiment, the IFFT subsystem includes an IFFT operator and a reversal module. While performing an IFFT operation, the IFFT operator outputs a data sequence in a predetermined order different from the order of the original data sequence. The reversal module is configured to rearrange the reordered data sequence back to the original data sequence. In rearranging the data sequence, the reversal module may use different reversal methods, depending on the type of the IFFT operation used for the transmitter. The reversal module may be positioned either at the input or at the output of the IFFT operator.

Figure 8:
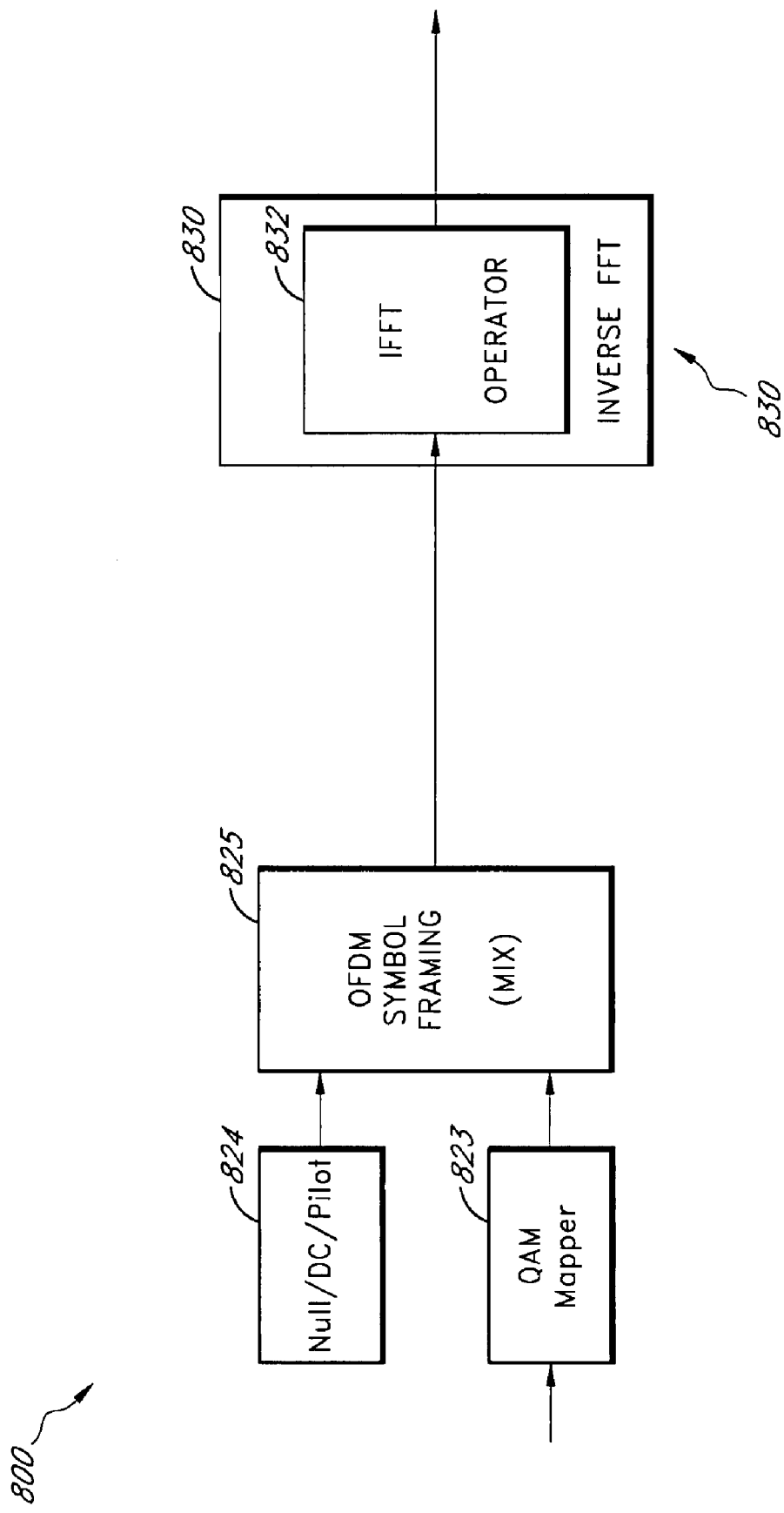
FIG. 8 is a functional block diagram of a portion of the transmitter of FIG. 3 according to another embodiment.

The wireless HD transmitter can also include a symbol interleaver configured to cancel the operation of the reversal module of the IFFT subsystem. The symbol interleaver may be a tone interleaver configured to permute bits across data tones within a symbol. The tone interleaver exploits frequency diversity across tones and provides robustness against narrow-band interferers. In another embodiment, the wireless HD transmitter can omit the tone interleaver and bit reversal module, thereby simplifying the design of the transmitter, as shown in FIG. 8.

Figure 4:
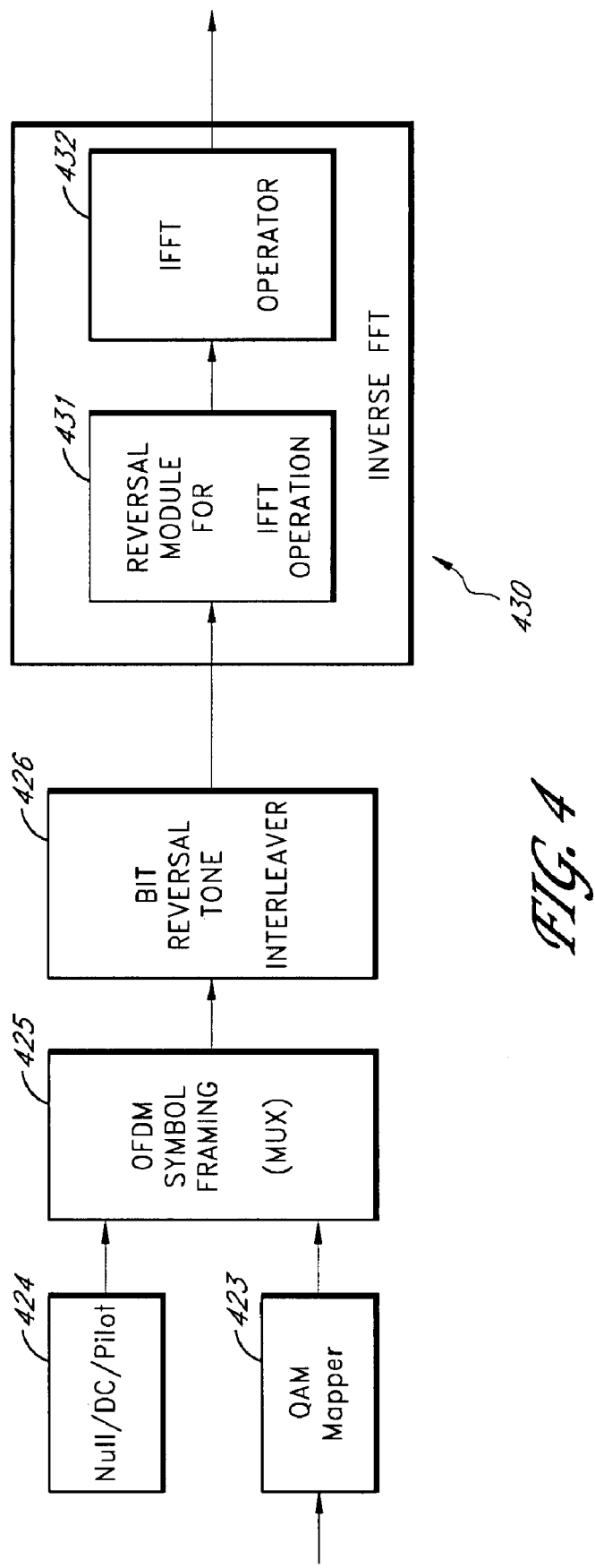
FIG. 4 is a functional block diagram of a portion of the transmitter of FIG. 3, having a tone interleaver according to one embodiment.

FIG. 4 illustrates a portion of the wireless HD transmitter of FIG. 3. The portion includes a symbol interleaver according to one embodiment. The illustrated symbol interleaver is a tone interleaver 426.

In the illustrated embodiment, the portion of the wireless transmitter includes a QAM mapper 423, a null/DC/pilot adder 424, an Orthogonal Frequency-Division Multiplexing (OFDM) symbol framing multiplexer 425, a tone interleaver 426, and an IFFT subsystem 430. The IFFT subsystem 430 may include a reversal module 431 and an IFFT operator 432. In the illustrated embodiment, the output of the QAM mapper 423 is connected to an input of the multiplexer 425. The output of the null/DC/pilot adder 424 is connected to another input of the multiplexer 425. The output of the multiplexer 425 is connected to the input of the tone interleaver 426. The output of the tone interleaver 426 is connected to the input of the reversal module 431. The output of the reversal module 431 is connected to the input of the IFFT operator 432.

The QAM mapper 423 is configured to map groups of bits (in time domain) to complex symbols (in frequency domain). In one embodiment, the QAM mapper 423 may be a 16-QAM mapper or 64-QAM mapper. The configuration of the QAM mapper 423 may be as described above with respect to that of mapper 323 of FIG. 3.

The null/DC/pilot adder 424 is configured to provide at least one of a null tone, a direct current (DC) tone, and a pilot tone. These tones are multiplexed with a data sequence output from the QAM mapper 423 by the OFDM symbol framing multiplexer 425. In order to facilitate the effectiveness of the tone interleaver 426, null tones and pilot tones are inserted before the tone interleaver operation which will be described below. The tones serve to provide additional bits to make the interleaver output size the same as the IFFT size of the IFFT subsystem 430.

The OFDM symbol framing multiplexer 425 is configured to multiplex output signals from the QAM mapper 423 and the null/DC/pilot adder 424. The multiplexer 425 thus provides a sequence of complex symbols with at least one of a null tone, a direct current (DC) tone, and a pilot tone inserted between the symbols.

In one embodiment, in order to make sure that the null/DC/pilot tones are at the right positions after symbol interleaving by the tone interleaver 426, they are inserted at the corresponding reversal positions by the multiplexer 425. As will be better understood from later description, the tone interleaver 426 reorders the data sequence. After the tone interleaver 432 performs such reordering, the null/DC/pilot tones are positioned at the right positions for an IFFT operation. For example, in a transmitter using a 32-point FFT, as shown in FIG. 5B, if two pilot tones are inserted at positions 8 and 24 of the tone interleaver input, the tones are output at positions 2 and 3 of the tone interleaver output. A skilled technologist will appreciate that the multiplexer 425 can insert the tones at any suitable position of the tone interleaver input, depending on the design of the IFFT subsystem 430.

The tone interleaver 426 is configured to reorder a data sequence so as to cancel the operation of the reversal module 431, as will be described below. In the illustrated embodiment, the tone interleaver 426 is positioned between the multiplexer 425 and the reversal module 431.

In one embodiment, the IFFT operator 432 is configured to operate based on radix-2 FFT. Radix-2 FFT results in bit-reversal reordering of an input data sequence. In such an embodiment, the reversal module 431 can be a bit reversal module 431 configured to rearrange the data sequence back into the original order. In one embodiment, the bit reversal module 431 is configured to perform bit-reversal reordering with input and output indices defined in Equations 1 and 2 below.

$$k = \sum_{j=0}^{n-1} a_j 2^j \quad (1)$$

$$\hat{k} = \sum_{j=0}^{n-1} a_j 2^{n-1-j} \quad (2)$$

In Equations 1 and 2, k is an index before the bit-reversal reordering, and $\hat{k}$ is an index after the bit-reversal reordering. $a_j$ can be either 1 or 0. The IFFT size of the IFFT operator 432 is $N=2^n$. For example, 4-bit reversal of 1=0001 is 1000=8 while 5 bit reversal is 10000=16.

Figure 5A:
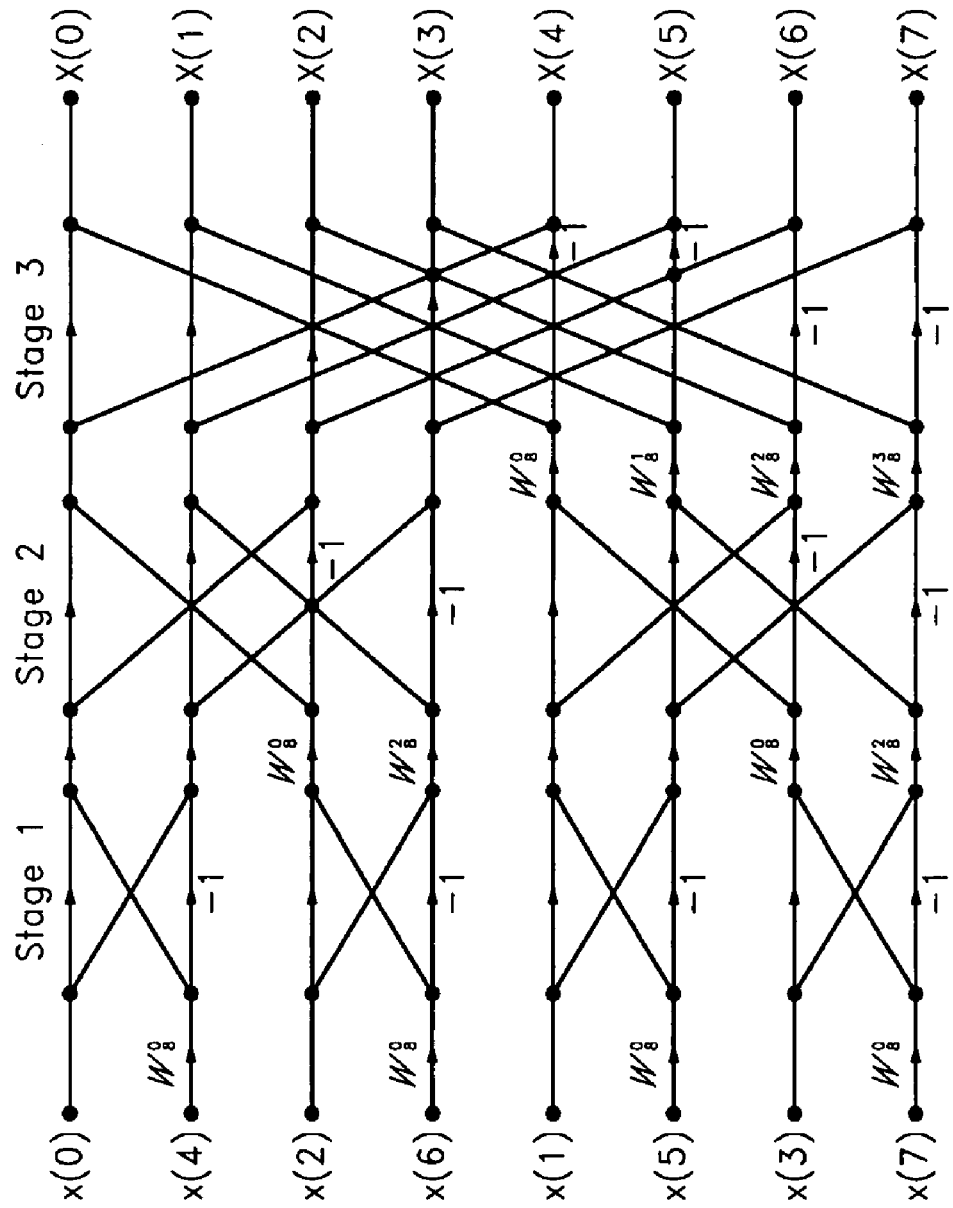
FIG. 5A is a diagram illustrating 8-point radix-2 decimation-in-time fast Fourier transform having inputs in a bit-reversal order and outputs in a natural order, according to one embodiment.
Figure 5B:
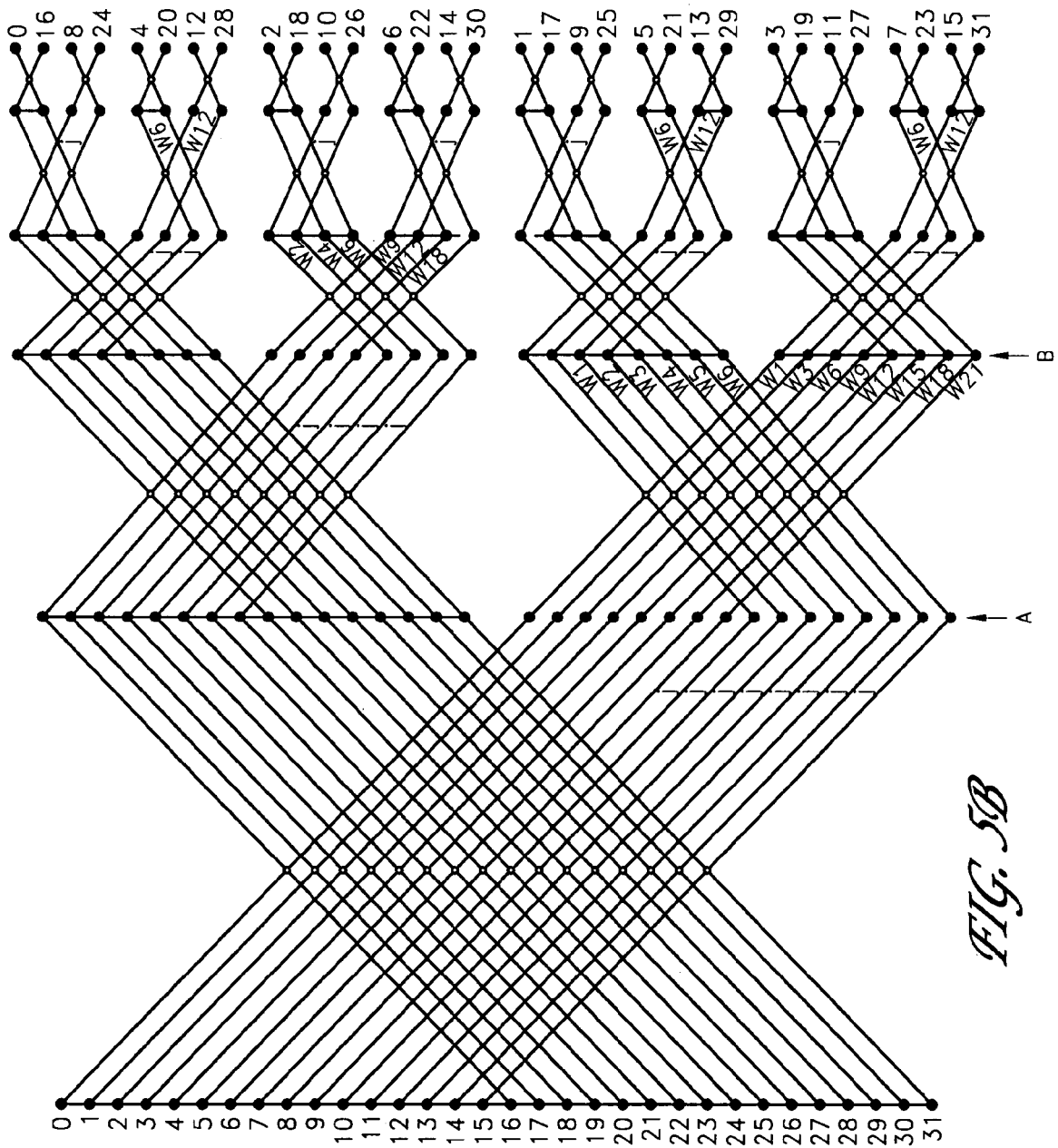
FIG. 5B is a diagram illustrating 32-point split-radix decimation-in-time fast Fourier transform having inputs in a natural order and outputs in a bit-reversal order, according to another embodiment.

FIG. 5A illustrates input and output sequences based on the bit-reversal reordering, according to one embodiment. In the illustrated embodiment, the input sequence is in a bit-reversal order and the output sequence is in a natural order. In FIG. 5A, the input sequence before the bit-reversal reordering is represented by x (n) on the left side (n is 0 to 7). The corresponding output sequence after the bit-reversal reordering is represented by X (n) on the right side (n is 0 to 7). For example, a bit input at the second position x (4) on the input side is output after the bit-reversal reordering at the fifth position X (4) on the output side. In the illustrated embodiment, the total number of inputs is $2^3=8$.

In the embodiment described above, the tone interleaver 426 is a bit reversal tone interleaver 426 configured to cancel the operation of the bit reversal module 431 for radix-2 FFT. The tone interleaver 426 performs the same operation as that of the bit reversal module 431. In other words, the tone interleaver 426 performs the same bit-reversal reordering operation as the bit reversal module 431. Thus, the tone interleaver 426 can have input and output indices defined in Equations 1 and 2 below.

$$k = \sum_{j=0}^{n-1} a_j 2^j \quad (1)$$

$$\hat{k} = \sum_{j=0}^{n-1} a_j 2^{n-1-j} \quad (2)$$

In Equations 1 and 2, k is an index before tone interleaving, and $\hat{k}$ is an index after tone interleaving. $a_j$ can be either 1 or 0. The IFFT size of the IFFT operator 432 is N=2.

In another embodiment, the IFFT operator 432 is configured to operate based on split-radix FFT. Split-radix FFT results in bit-reversal reordering of an input data sequence. The reversal module 431 can be a bit reversal module 431 configured to reorder bits in the data sequence back into the original order. FIG. 5B illustrates an input sequence before the bit reversal reordering and an output sequence after the bit reversal reordering for a split-radix FFT operation. The input sequence is in a natural order and the output sequence is in a bit-reversal order in the illustrated embodiment. In FIG. 5B, the total number of inputs is $2 \times 4^2 = 32$.

In the illustrated embodiment, the tone interleaver 426 can be a block interleaver. A block interleaver is configured to receive a set of symbols and rearrange them, without repeating or omitting any of the symbols in the set. The number of symbols in each set is fixed for a given interleaver. The interleaver's operation on a set of symbols is independent of its operation on all other sets of symbols.

In one embodiment, the block interleaver can have a block size of $2^r \times 2^c$, where r=ceiling (n/2) and c=floor (n/2). For example, when N (IFFT size) is 8, the block size is 4×2, with n=3, r=2, c=1. When N is 32, the block size is 8×4, with n=5, r=3, c=2. In another embodiment, when N is 412, the block size is 32×16, with n=9, r=5, c=4.

Figure 7A:
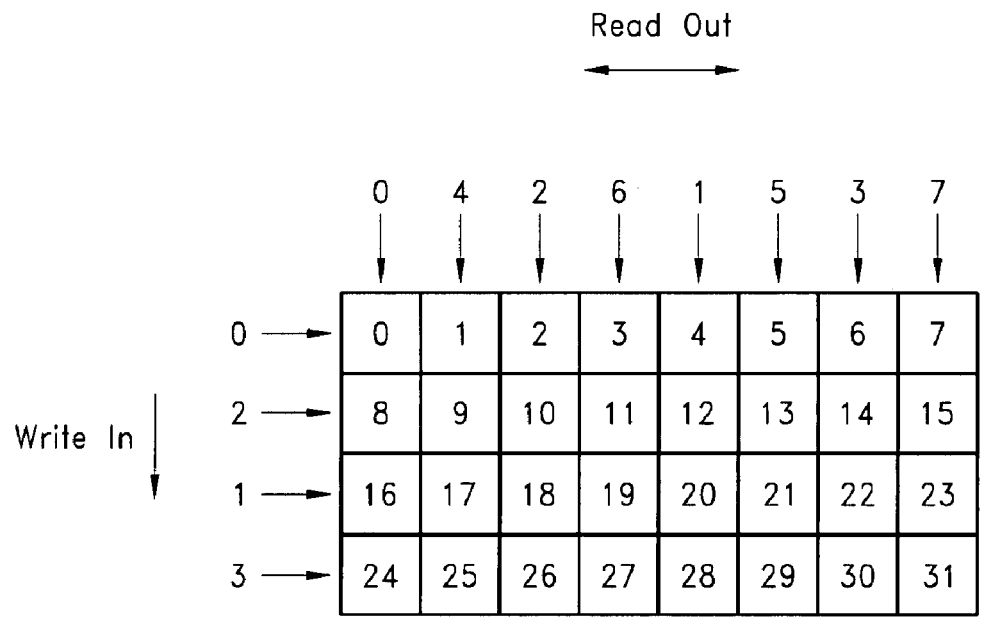
FIG. 7A is a table indicative of a block interleaver design for the tone interleaver of FIG. 4 in one embodiment.

In the block interleaver, an input is written row-by-row whereas an output is read out column-by-column. When read out column-by-column, the output may be read out in a skipping pattern. An example with N=32 is shown in FIG. 7A. In FIG. 7A, symbols 0-31 are written from the left to the right and sequentially row-by-row. In FIG. 7A, a column read-out pattern is shown on the top, and a row read-out pattern is shown on the left. In the illustrated embodiment, the output is read out in sequence: 0, 16, 8, 24, 4, 12, 20, 28, 2, 18, 10, 26, . . . , as shown in FIG. 5B.

In one embodiment, column written-in and read-out patterns may be represented by Equations 3 and 4 below.

$$k_r = \sum_{j=0}^{r-1} a_j 2^j \quad (3)$$

$$i_r = \sum_{j=0}^{r-1} a_j 2^{r-1-j} \quad (4)$$

In Equations 3 and 4, $k_r$ is a written-in column index, and $i_r$ is a read-out column index. In Equations 3 and 4, the read-out column index is the bit-reversal ordering of the written-in column index.

Similarly, row written-in and read-out patterns may be represented by Equations 5 and 6 below.

$$k_c = \sum_{j=0}^{c-1} a_j 2^j \quad (5)$$

$$i_c = \sum_{j=0}^{c-1} a_j 2^{c-1-j} \quad (6)$$

In Equations 5 and 6, kc is a written-in row index, and ic is a read-out row index. The read-out row index is the bit reversal ordering of the written-in row index.

In another embodiment, the IFFT operator 432 is configured to operate based on radix-4 FFT. Radix-4 FFT results in a quaternary-digit-reversal reordering of an input data sequence. The reversal module 431 can be a quaternary-digit-reversal module configured to perform a quaternary-digit-reversal reordering operation so as to reorder bits in the data sequence back into the original order. The quaternary-digit-reversal reordering may use input and output indices defined in Equations 5 and 6 below.

$$m = \sum_{j=0}^{n-1} a_j 4^j \quad (7)$$

$$\hat{m} = \sum_{j=0}^{n-1} a_j 4^{n-1-j} \quad (8)$$

Figure 6:
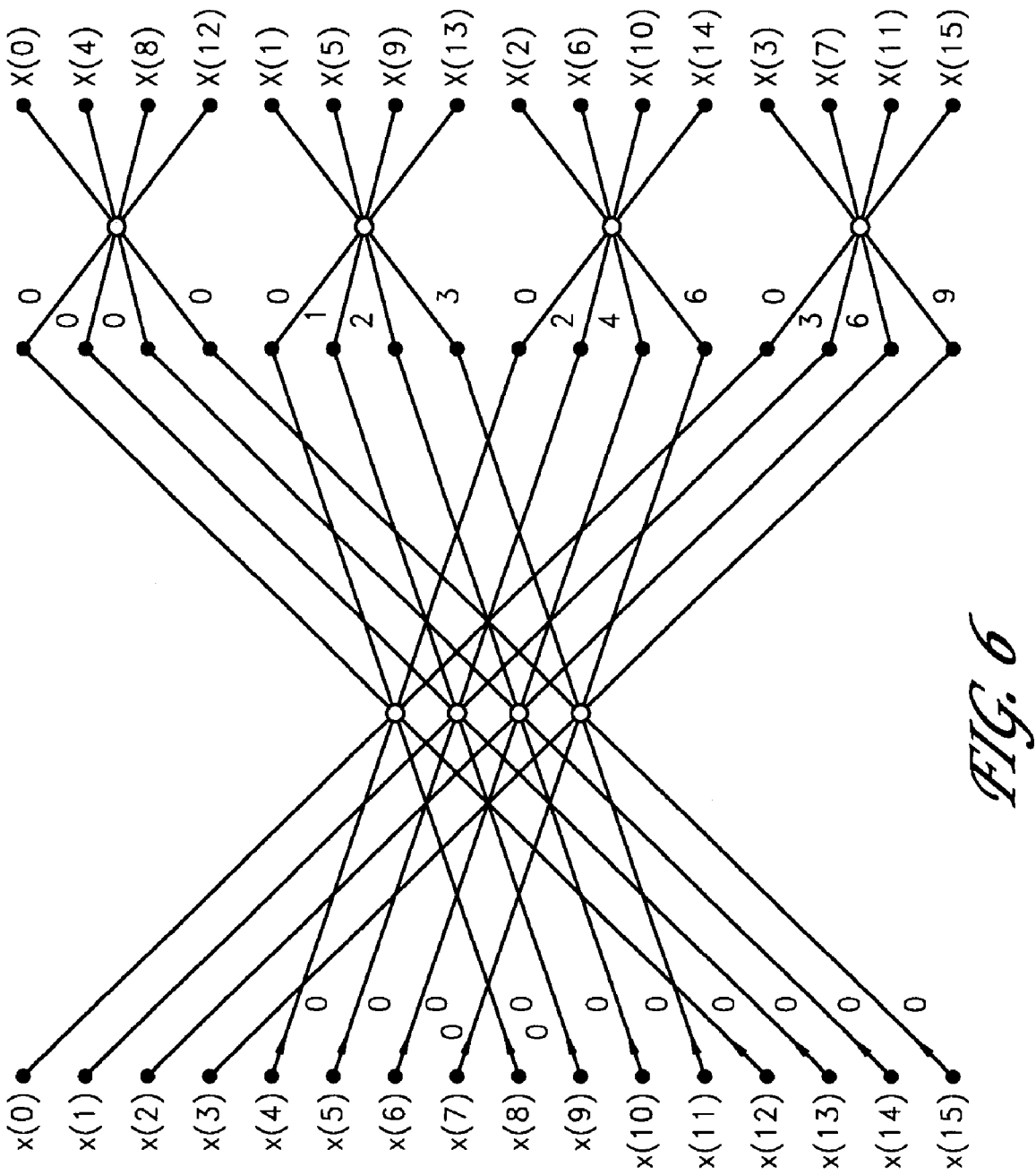
FIG. 6 is a diagram illustrating 16-point radix-4 decimation-in-time fast Fourier transform having inputs in a natural order and outputs in a quaternary-digit-reversal order, according to another embodiment.

In Equations 7 and 8, m is an index before the reordering, and $\hat{m}$ is an index after the reordering. $a_j$ can be 0, 1, 2, or 3. The IFFT size of the IFFT subsystem 430 (FIG. 4) is $N=4^n$. FIG. 6 illustrates an input sequence before the reversal reordering and an output sequence after the reversal reordering for a radix-4 FFT operation. In FIG. 6, the total number of inputs is $4^2=16$.

In the embodiment described above, the tone interleaver 426 is configured to cancel the operation of the quaternary-digit-reversal module 431 for radix-4 FFT. The tone interleaver 426 performs the same operation as that of the reversal module 431. In other words, the tone interleaver 426 performs the same quaternary-digit-reversal reordering operation as the reversal module 431. Thus, the tone interleaver 426 may have input and output indices defined in Equations 7 and 8 below.

$$m = \sum_{j=0}^{n-1} a_j 4^j \quad (7)$$

$$\hat{m} = \sum_{j=0}^{n-1} a_j 4^{n-1-j} \quad (8)$$

In Equations 7 and 8, m is an index before tone interleaving, and $\hat{m}$ is an index after tone interleaving. $a_j$ can be 0, 1, 2, or 3. The IFFT size of the IFFT subsystem 430 (FIG. 4) is $N=4^n$.

Figure 7B:
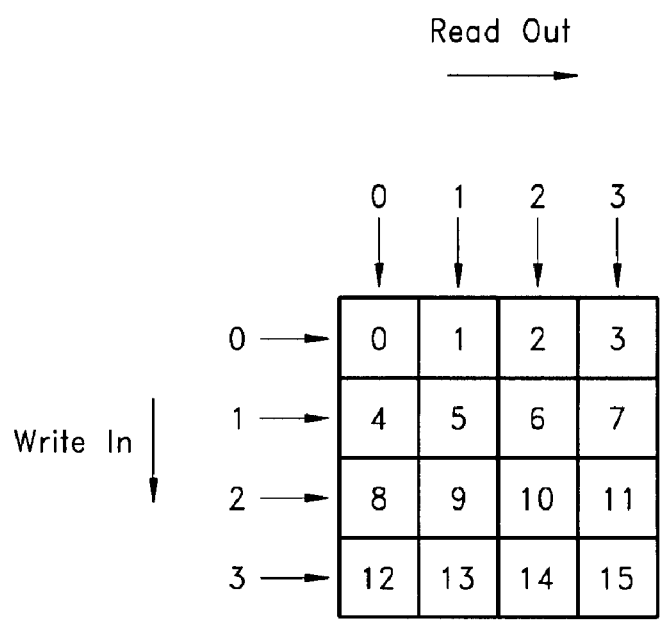
FIG. 7B is a table indicative of a block interleaver design for the tone interleaver of FIG. 4 in another embodiment.

In one embodiment, a block interleaver may be used to cancel the quaternary-digit-reversal ordering by the reversal module 431. The block interleaver can have a block size of $2^r \times 2^c$, where $r=c=n/2$. The operation is simply to write-in row-by-row and to read-out column-by-column, as shown in FIG. 7B. In the illustrated embodiment, N (the IFFT size of the IFFT subsystem 430) is 16.

FIG. 8 illustrates another embodiment of a portion 800 of the wireless HD transmitter of FIG. 3. The illustrated portion 800 includes a QAM mapper 823, a null/DC/pilot adder 824, an OFDM symbol framing multiplexer 825, and an IFFT subsystem 830. The IFFT subsystem 830 includes an IFFT operator 832.

The illustrated portion of the transmitter 800, however, does not include a reversal module in the IFFT subsystem 830. Nor does it include a symbol interleaver. This configuration provides the IFFT operator 832 with the same inputs as the portion of the transmitter described above with reference to FIG. 4. As described above, the tone interleaver 426 of FIG. 4 cancels the operation of the reversal module 431 of the IFFT subsystem 430. This is equivalent to having no operation between the OFDM multiplexer 425 and the IFFT operator 432. Thus, the transmitter 800 can include neither a reversal module nor a symbol interleaver between the multiplexer 825 and the IFFT operator 832, and yet achieves the same result. This configuration can simplify the transmitter design.

In another embodiment, a transmitter for a wireless communication system can include means for first reordering bits in a first sequence of a data stream, thereby generating a second sequence of the data stream. The means for first reordering can correspond to the tone interleaver 426 of FIG. 4. The transmitter may also include means for second reordering the bits in the data stream, thereby generating a third sequence of the data stream, such that the third sequence is the same as the first sequence. The means for second reordering can correspond to the reversal module 431 of FIG. 4. The transmitter may also include means for performing an IFFT operation on the data stream having the third sequence. The means for performing the IFFT operation may correspond to the IFFT operator 432 of FIG. 4. It will be appreciated that the means described above are not limited to the components of FIG. 4. It will also be appreciated that the means can be implemented using hardware, software or a combination of both.

The embodiments described above may apply to, for example, an orthogonal frequency-division multiplexing (OFDM) system. A skilled technologist will appreciate that the embodiments can also be adapted for use with other types of wireless communication systems.

The foregoing description is that of embodiments of the invention and various changes, modifications, combinations and sub-combinations may be made without departing from the spirit and scope of the invention, as defined by the appended claims.

What is claimed is:

1. A transmitter for a wireless communication system, comprising:
   a symbol interleaver configured to reorder a first sequence of a data stream to generate a second sequence of the data stream; and
   an inverse fast Fourier transform (IFFT) subsystem comprising:
      a reversal module configured to reorder the second sequence of the data stream to generate a third sequence of the data stream, and
      an IFFT operator configured to perform an IFFT operation on the third sequence of the data stream,
   wherein the symbol interleaver is configured to reorder the first sequence of the data stream such that the first sequence is the same as the third sequence,
   wherein the reversal module comprises a bit reversal module configured to reorder bits of the second sequence of the data stream, and
   wherein the first sequence is represented by a first index represented by Equation 1 and the second data sequence is represented by a second index represented by Equation 2:

$$k = \sum_{j=0}^{n-1} a_j 2^j \quad (1)$$

$$\hat{k} = \sum_{j=0}^{n-1} a_j 2^{n-1-j} \quad (2)$$

wherein k is the first index and $\hat{k}$ is the second index; and $a_j$ is 1 or 0; and
wherein the IFFT size of the IFFT operator is $N=2^n$.

2. The transmitter of claim 1, wherein the third sequence is represented by the first index.

3. A transmitter for a wireless communication system, comprising:
   a symbol interleaver configured to reorder a first sequence of a data stream to generate a second sequence of the data stream; and
   an inverse fast Fourier transform (IFFT) subsystem comprising:
      a reversal module configured to reorder the second sequence of the data stream to generate a third sequence of the data stream, and
      an IFFT operator configured to perform an IFFT operation on the third sequence of the data stream,
   wherein the symbol interleaver is configured to reorder the first sequence of the data stream such that the first sequence is the same as the third sequence,
   wherein the reversal module comprises a bit reversal module configured to reorder quaternary-digits of the second sequence of the data stream, and
   wherein the first sequence is represented by a first index represented by Equation 7 and the second data sequence is represented by a second index represented by Equation 8:

$$m = \sum_{j=0}^{n-1} a_j 4^j \quad (7)$$

$$\hat{m} = \sum_{j=0}^{n-1} a_j 4^{n-1-j} \quad (8)$$

wherein m is the first index and $\hat{m}$ is the second index; and $a_j$ is 0, 1, 2, or 3; and
wherein the IFFT size of the IFFT operator is $N=4^n$.

4. A transmitter for a wireless communication system, comprising:
   a symbol interleaver configured to reorder a first sequence of a data stream to generate a second sequence of the data stream;
   an inverse fast Fourier transform (IFFT) subsystem comprising:
   a reversal module configured to reorder the second sequence of the data stream to generate a third sequence of the data stream, and
   an IFFT operator configured to perform an IFFT operation on the third sequence of the data stream;
   a tone adder configured to provide at least one tone of a null tone, a direct current (DC) tone, and a pilot tone;
   a mapper configured to provide a data stream; and
   a multiplexer configured to multiplex the at least one tone from the tone adder and the data stream from the mapper to generate the first sequence of the data stream,
   wherein the symbol interleaver is configured to reorder the first sequence of the data stream such that the first sequence is the same as the third sequence, and
   wherein the multiplexer is configured to insert the at least one tone at a first predetermined position in the first sequence of the data stream, and wherein the first predetermined position corresponds to a second predetermined position in the second sequence of the data stream.

5. A method of wirelessly transmitting data, the method comprising:
   first reordering bits in a first sequence of a data stream to generate a second sequence of the data stream;
   second reordering bits in the second sequence of the data stream to generate a third sequence of the data stream, such that the third sequence is the same as the first sequence; and
   performing an IFFT operation on the third sequence of the data stream,
   wherein second reordering the bits comprises reordering the bits one bit at a time, and wherein the first sequence is represented by a first index represented by Equation 1 and the second data sequence is represented by a second index represented by Equation 2:

$$k = \sum_{j=0}^{n-1} a_j 2^j \quad (1)$$

$$\hat{k} = \sum_{j=0}^{n-1} a_j 2^{n-1-j} \quad (2)$$

wherein k is the first index and $\hat{k}$ is the second index; and $a_j$ is 1 or 0; and
wherein the IFFT size of the IFFT operator is $N=2^n$.

6. The method of claim 5, wherein the third sequence is represented by the first index.

7. A method of wirelessly transmitting data, the method comprising:
   first reordering bits in a first sequence of a data stream to generate a second sequence of the data stream;
   second reordering bits in the second sequence of the data stream to generate a third sequence of the data stream, such that the third sequence is the same as the first sequence; and
   performing an IFFT operation on the third sequence of the data stream,
   wherein second reordering the bits comprises reordering the bits four bits at a time, and wherein the first sequence is represented by a first index represented by Equation 7 and the second data sequence is represented by a second index represented by Equation 8:

$$m = \sum_{j=0}^{n-1} a_j 4^j \quad (7)$$

$$\hat{m} = \sum_{j=0}^{n-1} a_j 4^{n-1-j} \quad (8)$$

wherein m is the first index and $\hat{m}$ is the second index; and $a_j$ is 0, 1, 2, or 3; and wherein the IFFT size of the IFFT operator is $N=4^n$.

* * * * *